No. 649,303. Patented May 8, 1900.
G. HARTER.
BALL AND SOCKET SELF ADJUSTING JOINT FOR PIPES OR TUBES.
(Application filed Dec. 7, 1899.)
(No Model.) 3 Sheets—Sheet 1.
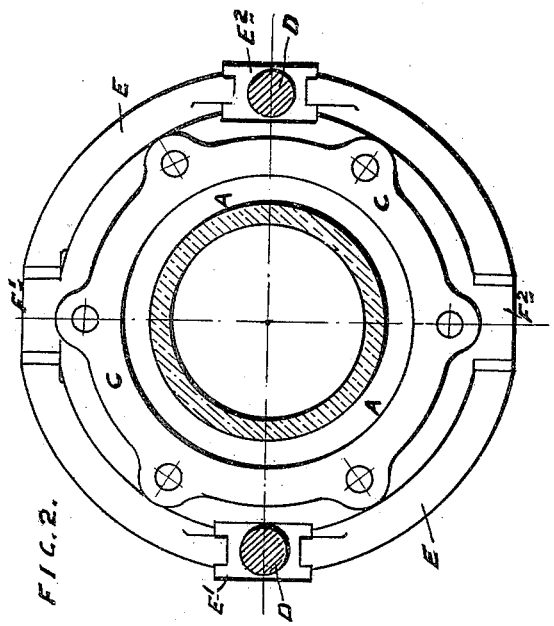
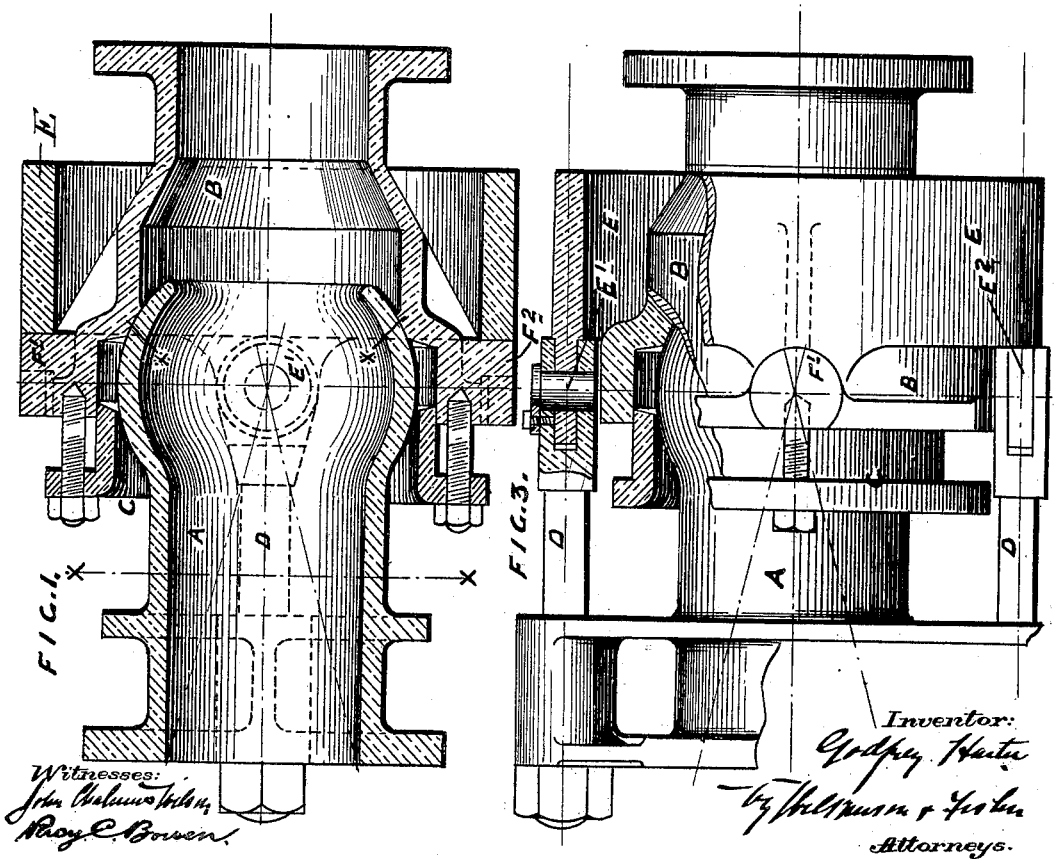

No. 649,303. Patented May 8, 1900.
G. HARTER.
BALL AND SOCKET SELF ADJUSTING JOINT FOR PIPES OR TUBES.
(Application filed Dec. 7, 1899.)
(No Model.) 3 Sheets—Sheet 2.
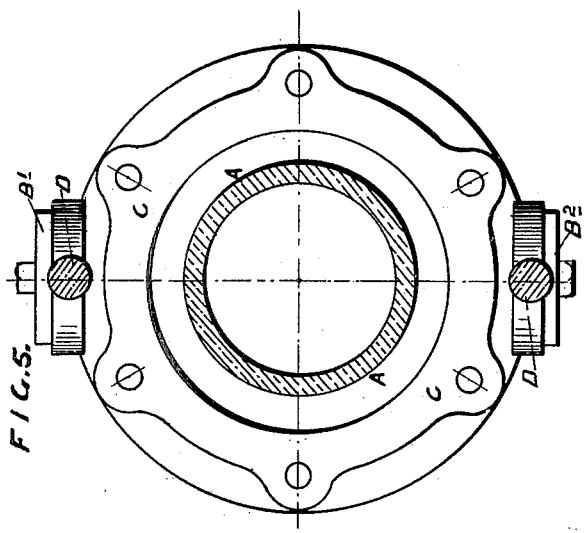
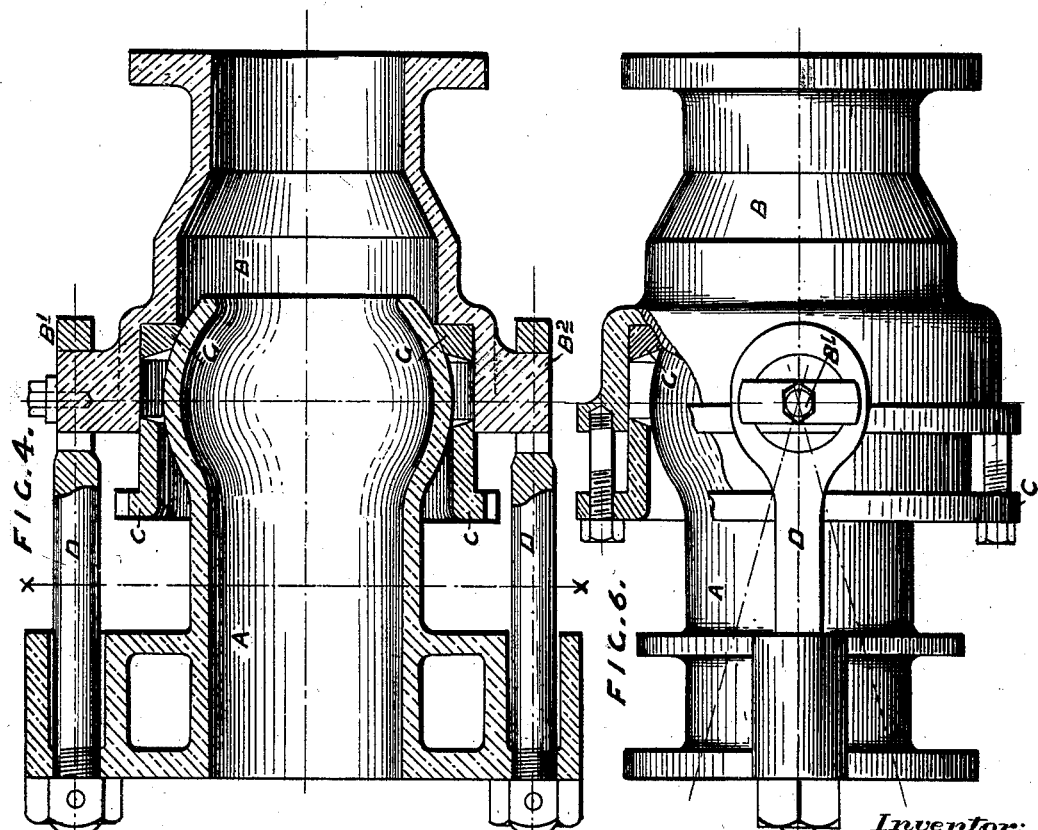
Witnesses: Inventor:

No. 649,303. Patented May 8, 1900.
G. HARTER.
BALL AND SOCKET SELF ADJUSTING JOINT FOR PIPES OR TUBES.
(Application filed Dec. 7, 1899.)
(No Model.) 3 Sheets—Sheet 3.
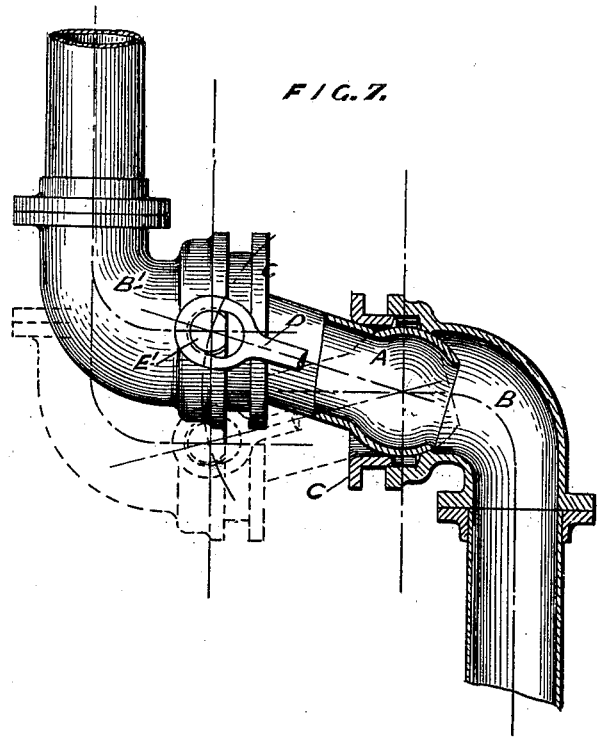
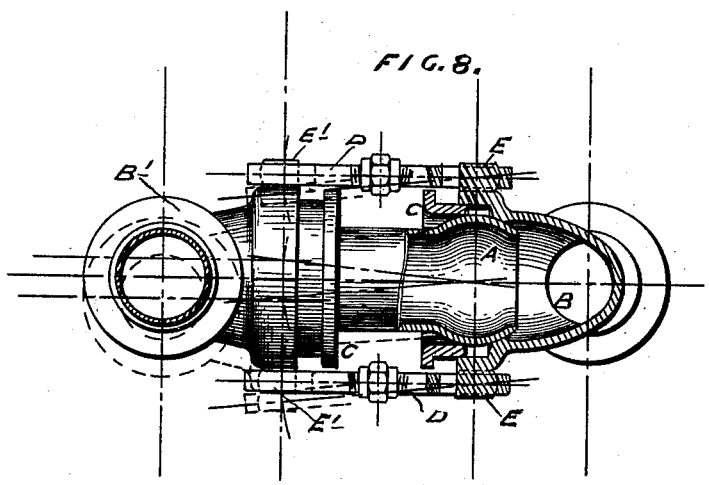

UNITED STATES PATENT OFFICE.

GODFREY HARTER, OF CULLERCOATS, ENGLAND.

BALL-AND-SOCKET SELF-ADJUSTING JOINT FOR PIPES OR TUBES.

SPECIFICATION forming part of Letters Patent No. 649,303, dated May 8, 1900.

Application filed December 7, 1899. Serial No. 739,571. (No model.)

*To all whom it may concern:*

Be it known that I, GODFREY HARTER, engineer, a subject of the Queen of Great Britain and Ireland, residing at Cullercoats, in the borough of Tynemouth and county of Northumberland, England, have invented certain new and useful Improvements in Ball-and-Socket Self-Adjusting Joints for Pipes or Tubes; and I do hereby declare the following to be a full, clear, and exact description of the invention, such as will enable others skilled in the art to which it appertains to make and use the same.

The objects of my invention are to provide a perfectly-reliable flexible connecting joint or joints in a line or lines of steam or other high-pressure fluid pipes or tubes having self-adjusting angular movement in any direction, so as to obviate straining and breaking of the pipes or their flanges due to expansion of pipes themselves or of boiler, engines, &c., to which they may be connected, or to relative movement of either from any cause—such as vibration of engines, flexibility of hull structure in marine application, or where the points of attachment may have separate movements, as in locomotive or traction engines—and has special reference to steam or feed pipes under the very high pressure now prevailing.

On the accompanying drawings my invention is shown in some of the different modifications in which it may be practically applied, which will sufficiently explain the principle of its action, which is that of the ball and socket, but arranged so that the load due to internal pressure does not come on the surfaces of the ball and socket themselves, but on external pivoted bolts or stays, thereby reducing the resistance to movement considerably and also providing for steam-tightness by a separate and independent packed gland and the joints being so connected as to secure them from being blown asunder.

In the accompanying drawings, in which the same letters of reference indicate the same parts throughout the several views, Figure 1 represents a central section of my invention, showing a joint which allows of angular adjustment in any direction, the load due to internal pressure being taken by external connecting-bolts, in conjunction with a "gimbal-ring." Fig. 2 is an end section on line $x\,x$ of Fig. 1. Fig. 3 is a plan, partly in section. Fig. 4 is a central section of a modification of my invention, showing means for allowing of angular adjustment in one plane only, for which purpose the gimbal-ring is dispensed with. Fig. 5 is an end section on the line $x\,x$ of Fig. 4. Fig. 6 is a plan view of same, partly in section. Fig. 7 is a side view, partly in section, showing one form of adapting my invention as an expansion-joint in a line of pipes; but I may provide for effecting this by several modifications in the arrangement of the working parts to meet various cases; and Fig. 8 is a plan view, partly in section, of the expansion-joint represented in Fig. 7.

Referring to Sheet 1, A is the hollow ball-piece, and B the socket-piece, fitted with a packed gland C. D D are two stay-bolts fitted with nuts for preventing the ball-piece from being blown (or forced) out of the socket by the pressure of the steam, connecting the ball-piece A freely to the gimbal-ring E at the points $E'$ and $E^2$, so as to allow movement in one plane on either side of the center line, (indicated by the radial lines, Fig. 1.) The gimbal-ring E is pivoted at the points $F'\,F^2$ to the socket-piece B, Figs. 2 and 3, and allows movement in the other direction at right angles, clearance-space being allowed between it and the socket-piece for the purpose. This form of my invention having double adjustment, as shown, of about fifteen degrees on each side of the axis is intended for very high pressure, as are also the forms shown on Sheets 2 and 3, and I may in all cases supplement the tightness of the packing in the stuffing-box by water-grooves cut around the inside of the face of socket B at \*; or this face may be lined with some suitable metal or alloy or asbestos, &c., or there may be a separate renewable neck-ring G, as shown in Fig. 4, of the same or different material to the rest of the socket, which ring may be fitted with water-grooves. This ring may either fit close into the socket-piece or be turned to a smaller diameter on the outside, so as to allow slight lateral movement, while still maintaining good metallic contact between it and the ball.

Referring now to Sheet 2, A is the hollow ball, and B the socket-piece, fitted with the packed gland C. D D are the two connecting-bolts, flexibly connected to the socket-piece B at the points B' B². This modification only allows movement in one plane of about fifteen degrees, more or less, on each side, as may be required in different cases.

Referring to Sheet 3, Fig. 7 shows, partly in section, a double ball-piece A, flexibly connected to separate socket-pieces B B' by the bolts or stays D and forming an elbow-joint, the extent of angular movement being indicated by the full and dotted lines, respectively. In this case the pivots E E' may be formed as portions of spheres, and will thus allow movement in the other direction, as shown on Fig. 7 and in two parts as on Fig. 8. It will be understood that this is one form only in which my invention may be adapted as an expansion-joint, as various modifications may be made to meet different cases, the essential action being the same. I may also in some cases use the gimbal-ring, so as to provide for adjustment in two planes, as on Sheet 1, thus combining an expansion-joint with adjustment against distortion from various causes in both planes. Although I prefer the stays or bolts connecting the ball-piece and socket-piece to be screwed bolts with nuts, as shown, as being adjustable, they may be made in the form of flat links secured to one piece by tap-bolts and with a loop to take a projecting stud on the other piece or in other modified forms.

Having now described my invention, what I claim as new, and desire to secure by Letters Patent, is—

1. In a flexible pipe-joint, the combination with a socket member, of a ball member, rods secured to said ball member and pivotally connected with said socket member, substantially as described.

2. In a flexible pipe-joint, the combination with a socket member, a ring loosely set in said socket member, a bushing for said socket member; of a ball member, rods secured to said ball member and pivotally connected with said socket member, substantially as described.

3. In a flexible pipe-joint, the combination with a socket member, a ring or band around said socket member and pivoted thereto; of a ball member, rods secured to said ball member and flexibly connected to said ring or band, substantially as described.

4. In a flexible pipe-joint the combination with a socket member, a ring or band surrounding and pivoted to said socket member, a bushing in said socket member; of a ball member, bolts or rods secured at one end to said ball member and pivotally connected at their other end to said ring or band, substantially as described.

In testimony whereof I affix my signature in presence of two witnesses.

GODFREY HARTER.

Witnesses:
A. B. GOLDSBROUGH,
JASPER RICHARDSON.